US007733917B2

(12) United States Patent
Han et al.

(10) Patent No.: US 7,733,917 B2
(45) Date of Patent: Jun. 8, 2010

(54) APPARATUS AND METHOD FOR TRANSMITTING CONTROL INFORMATION IN A MOBILE COMMUNICATION SYSTEM

(75) Inventors: Jeong-Hoon Han, Seoul (KR); Young-Seok Lim, Seoul (KR); Ju-Ho Lee, Suwon-si (KR); Youn-Hyoung Heo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1151 days.

(21) Appl. No.: 11/055,608

(22) Filed: Feb. 11, 2005

(65) Prior Publication Data
US 2005/0190728 A1    Sep. 1, 2005

(30) Foreign Application Priority Data
Feb. 14, 2004    (KR) ............... 10-2004-0009858

(51) Int. Cl.
*H04B 3/10* (2006.01)
*H04B 7/00* (2006.01)
*H04J 3/14* (2006.01)
*H04J 1/16* (2006.01)
*H04J 3/12* (2006.01)
*H04L 1/00* (2006.01)
*G01R 31/08* (2006.01)

(52) U.S. Cl. .............. 370/500; 370/236; 370/491; 370/527; 455/522

(58) Field of Classification Search .......... 370/486, 370/522, 524, 527, 529, 535, 218, 236, 231, 370/235, 238, 400, 491, 496, 500; 714/751, 714/218; 455/450, 522, 452.1, 306, 455

See application file for complete search history.

(56) References Cited

U.S. PATENT DOCUMENTS

| 5,634,205 | A * | 5/1997 | Kurisu et al. ............. 455/182.2 |
| 6,285,663 | B1 * | 9/2001 | Esmailzadeh ............... 370/311 |
| 6,600,934 | B1 * | 7/2003 | Yun et al. ................ 455/562.1 |
| 6,639,936 | B2 * | 10/2003 | Kanterakis et al. .......... 375/130 |
| 6,708,037 | B1 * | 3/2004 | Moulsley et al. ......... 455/452.1 |
| 6,785,548 | B2 * | 8/2004 | Moulsley et al. ............ 455/450 |
| 6,937,640 | B2 * | 8/2005 | Yun et al. .................... 375/141 |

(Continued)

FOREIGN PATENT DOCUMENTS

EP    1564923 A1 *    8/2005

(Continued)

*Primary Examiner*—Jayanti K Patel
*Assistant Examiner*—Christopher T Wyllie
(74) *Attorney, Agent, or Firm*—Roylance, Abrams, Berdo & Goodman, LLP

(57)    ABSTRACT

An apparatus and method for transmitting/receiving control information using a pilot pattern inserted in a plot field of a dedicated physical channel in a mobile communication system including a transmitter for transmitting data and a receiver for receiving the data. The apparatus and method include selecting control information according to whether the data is received; and selecting a pilot pattern according to the control information, and inserting the selected pilot pattern in a pilot field of a dedicated physical channel as the control information, before transmission. The pilot pattern includes a first pilot pattern used when the control information is not transmitted, a second pilot pattern being orthogonal with the first pilot pattern, and a third pilot pattern generated by inverting a sign of the second pilot pattern.

13 Claims, 7 Drawing Sheets

U.S. PATENT DOCUMENTS

| | | | | |
|---|---|---|---|---|
| 6,947,476 | B2 * | 9/2005 | Song | 375/149 |
| 6,977,888 | B1 * | 12/2005 | Frenger et al. | 370/218 |
| 7,089,015 | B2 * | 8/2006 | Fukui | 455/450 |
| 7,133,688 | B2 * | 11/2006 | Das et al. | 455/522 |
| 7,167,719 | B2 * | 1/2007 | Agin | 455/522 |
| 7,248,606 | B2 * | 7/2007 | Sato | 370/524 |
| 7,447,515 | B2 * | 11/2008 | Han et al. | 455/522 |
| 7,602,841 | B2 * | 10/2009 | Song | 375/149 |
| 2001/0026547 | A1 * | 10/2001 | Moulsley et al. | 370/347 |
| 2002/0141367 | A1 * | 10/2002 | Hwang et al. | 370/335 |
| 2003/0137996 | A1 * | 7/2003 | Roh et al. | 370/491 |
| 2003/0185159 | A1 * | 10/2003 | Seo et al. | 370/278 |
| 2003/0185242 | A1 * | 10/2003 | Lee et al. | 370/491 |
| 2004/0047410 | A1 * | 3/2004 | Choi et al. | 375/232 |
| 2004/0193869 | A1 * | 9/2004 | Utsumi et al. | 713/2 |
| 2004/0203980 | A1 * | 10/2004 | Das et al. | 455/522 |
| 2004/0248541 | A1 * | 12/2004 | Park | 455/306 |
| 2005/0181816 | A1 * | 8/2005 | Han et al. | 455/522 |
| 2005/0190728 | A1 * | 9/2005 | Han et al. | 370/335 |
| 2005/0201486 | A1 * | 9/2005 | Han et al. | 375/295 |
| 2005/0213505 | A1 * | 9/2005 | Iochi et al. | 370/236 |
| 2005/0281290 | A1 * | 12/2005 | Khandekar et al. | 370/500 |
| 2006/0018259 | A1 * | 1/2006 | Kadous | 370/236 |

FOREIGN PATENT DOCUMENTS

| | | |
|---|---|---|
| KR | 2000-0075106 | 12/2000 |
| KR | 2004-0104985 | 12/2004 |
| KR | 2005-0047027 | 5/2005 |

* cited by examiner

APPARATUS AND METHOD FOR TRANSMITTING CONTROL INFORMATION IN A MOBILE COMMUNICATION SYSTEM

PRIORITY

This application claims the benefit under 35 U.S.C. § 119(a) to an application entitled "Apparatus and Method for Transmitting Control Information in a Mobile Communication System" filed in the Korean Intellectual Property Office on Feb. 14, 2004 and assigned Ser. No. 2004-9858, the entire contents of which are incorporated herein by reference.

BACKGROUND OF THE INVENTION

1. Field of the Invention

The present invention relates generally to a mobile communication system. In particular, the present invention relates to an apparatus and method for transmitting control information in a mobile communication system.

2. Description of the Related Art

Code Division Multiple Access (CDMA) mobile communication systems developed from a voice based IS-95 standard into a high-speed data transmission based IMT-2000 that also supports voice signal transmission. The IMT-2000 standard provides high-quality voice service, moving image service, and Internet search service.

In the mobile communication system, various schemes for servicing such information as voice and data are being realized, and a typical one of the schemes is a High Speed Downlink Packet Access (HSDPA) scheme in a Universal Mobile Telecommunications System (UMTS) communication system.

Generally, the HSDPA scheme refers to a data transmission scheme, including a high speed-downlink shared channel (HS-DSCH), which is a downlink data channel for supporting high-speed downlink packet data transmission, and its associated control channels. In order to support the high-speed downlink packet data service, an Adaptive Modulation and Coding (AMC) scheme, a Hybrid Automatic Retransmission Request (HARQ) scheme, and a Fast Cell Select (FCS) scheme have been proposed. A description will now be made of the HARQ scheme, especially, an n-channel Stop And Wait HARQ (n-channel SAW HARQ) scheme.

In the HARQ scheme, the following two methods have recently been applied to increase the transmission efficiency of an Automatic Retransmission Request (ARQ) scheme. According to a first method, retransmission request and Acknowledgement/Negative-Acknowledgement (ACK/NACK) are exchanged between a user equipment (UE) and a Node B. According to a second method, a UE temporarily stores defective data and combines the stored defective data with retransmitted data of the corresponding defective data before decoding the data. The high-speed downlink packet data service method has introduced the n-channel SAW HARQ scheme in order to compensate for the defect of the conventional Stop And Wait ARQ (SAW ARQ) scheme. In the case of the SAW ARQ scheme, next packet data cannot be transmitted before an ACK for a previous packet data is received. Therefore, in some cases, a UE should wait for an ACK even though it can currently transmit packet data.

In the n-channel SAW HARQ scheme, a UE continuously transmits a plurality of data packets before it receives the ACK for a previous data packet, thereby increasing channel efficiency. That is, if each of n logical channels established between a UE and a Node B can be identified by a specific time or its unique channel number, the UE receiving packet data at a specific time can determine a channel over which the packet data was received. Therefore, the UE can take necessary measures such as reordering data packets in their right reception order and soft-combining the corresponding data packets.

Table 1 and Table 2 below illustrate downlink and uplink physical channels used in a mobile communication system, respectively.

TABLE 1

| Downlink Physical Channels | Functions |
| --- | --- |
| DPDCH | Dedicated Physical Data Channel |
| DPCCH | Dedicated Physical Control Channel |
| CPICH | Common Pilot Channel |
| P-CCPCH | Primary Common Control Physical Channel |
| S-CCPCH | Secondary Common Control Physical Channel |
| SCH | Synchronization Channel |
| PDSCH | Physical Downlink Shared Channel |
| AICH | Acquisition Indicator Channel |
| AP-AICH | Access Preamble Acquisition Indicator Channel |
| PICH | Paging Indicator Channel |
| CSICH | CPCH (Common Packet Channel) Status Indicator Channel |
| CD/CA-ICH | CPCH Collision Detection/Channel Assignment Indicator Channel |
| HS-PDSCH | High Speed-Physical Downlink Shared Control Channel |
| HS-SCCH | High Speed-Shared Control Channel |

TABLE 2

| Uplink Physical Channels | Functions |
| --- | --- |
| DPDCH | Dedicated Physical Data Channel |
| DPCCH | Dedicated Physical Control Channel |
| PRACH | Physical Random Access Channel |
| PCPCH | Physical Common Packet Channel |
| HS-DPCCH | High Speed-Dedicated Physical Control Channel |

The downlink physical channels are distinguished using orthogonal variable spreading factor (OVSF) codes.

In order to support a packet data service with an uplink in a mobile communication system, a similar scheme to the scheme for supporting a packet data service with a downlink can be introduced. Therefore, in order to provide a packet data service in an uplink, it is necessary to transmit packet data of the uplink and control information of the downlink. The control information refers to, for example, "ACK/NACK information." A scheme for transmitting control information including the ACK/NACK information using the downlink is classified into a scheme for transmitting the control information over an existing physical channel after time multiplexing, and a scheme for transmitting the control information over the existing physical channel after code multiplexing.

The time multiplexing scheme and the code multiplexing scheme will be described herein below with reference to FIGS. 1 and 2, respectively.

FIG. 1 illustrates a structure of a downlink physical channel for time-multiplexing ACK/NACK information, control information, with data before transmission. The types and functions of physical channels in the downlink have been illustrated in Table 1. Referring to FIG. 1, the ACK/NACK information which is control information is time-multiplexed to a space generated by puncturing data on a physical channel, before being transmitted. That is, the physical channel includes the ACK/NACK in a partial duration where no data is transmitted, before being transmitted.

FIG. 2 illustrates a structure of a downlink physical channel for code-multiplexing ACK/NACK information, control information, with an existing physical channel before transmission. Referring to FIG. 2, a separate physical channel for transmitting ACK/NACK information is generated in addition to an existing physical channel, and the ACK/NACK information is transmitted over the generated physical channel. The existing physical channel and the physical channel for transmitting the ACK/NACK information are separated using OVSF codes, as described above. Also, the physical channel for transmitting the ACK/NACK information can include control information indicating an ACK/NACK information transmission channel.

The time multiplexing scheme illustrated in FIG. 1 should include the ACK/NACK information which is control information in a partial duration of an existing physical channel, causing a possible loss of data transmitted over the existing physical channel. Although the code multiplexing scheme illustrated in FIG. 2 prevents data loss in the existing physical channel, it requires additional power and OVSF codes for the physical channel generated to transmit the ACK/NACK information which is control information.

SUMMARY OF THE INVENTION

It is, therefore, an object of the present invention to provide an apparatus and method for transmitting control information for packet data without assigning a separate channel.

It is another object of the present invention to provide an apparatus and method for transmitting control information for packet data without a loss of other data.

It is further another object of the present invention to provide an apparatus and method for transmitting control information without using a separate channel or code, thereby preventing performance deterioration.

It is yet another object of the present invention to provide an apparatus and method for modulating a pattern and phase of a pilot field of a dedicated physical channel in order to transmit control information without requiring a separate overhead.

In accordance with a first aspect of the present invention, there is provided a method for transmitting control information for receipt of data in a receiver in a mobile communication system including a transmitter for transmitting data and the receiver for receiving the data. The method comprises the steps of selecting control information according to whether the data is received; and selecting a pilot pattern according to the control information, and inserting the selected pilot pattern in a pilot field of a physical channel as the control information, before transmission; wherein the pilot pattern includes a first pilot pattern used when the control information is transmitted, a second pilot pattern being orthogonal with the first pilot pattern for a second control information, and a third pilot pattern generated by inverting a sign of the second pilot pattern for a third control information.

In accordance with a second aspect of the present invention, there is provided a method for receiving control information for receipt of data transmitted by a receiver in a transmitter in a mobile communication system including the transmitter for transmitting data and the receiver for receiving the data. The method comprises the steps of detecting a pilot pattern inserted as the control information from a pilot field of a physical channel transmitted from the transmitter in response to the data; and determining whether the data is received and, if received, whether the received data is defective, based on the detected pilot pattern; wherein the pilot pattern includes a first pilot pattern used when a first control information is not transmitted, a second pilot pattern being orthogonal with the first pilot pattern for a second control information, and a third pilot pattern generated by inverting a sign of the second pilot pattern for a third control information.

In accordance with a third aspect of the present invention, there is provided an apparatus for transmitting control information for receipt of data in a receiver in a mobile communication system including a transmitter for transmitting data and the receiver for receiving the data. The apparatus comprises a pilot pattern selector for selecting one pilot pattern from among a predetermined number of different pilot patterns according to whether the data is received and, if received, whether the received data is defective; a pilot pattern inserter for inserting the selected pilot pattern in a pilot field of a physical channel as the control information; and an antenna for transmitting the physical channel; wherein the pilot patterns include a first pilot pattern used when a first control information is not transmitted, a second pilot pattern being orthogonal with the first pilot pattern for a second control information, and a third pilot pattern generated by inverting a sign of the second pilot pattern.

In accordance with a fourth aspect of the present invention, there is provided an apparatus for receiving control information for receipt of data transmitted by a receiver in a transmitter in a mobile communication system including the transmitter for transmitting data and the receiver for receiving the data. The apparatus comprises a channel compensator for performing channel compensation on a physical channel transmitted from the transmitter in response to the data; and a control signal discriminator for detecting a pilot pattern inserted as the control information from a pilot field of the physical channel, and outputting control information corresponding to the detected pilot pattern; wherein the pilot pattern includes a first pilot pattern used when a first control information is transmitted, a second pilot pattern being orthogonal with the first pilot pattern for a second control information, and a third pilot pattern generated by inverting a sign of the second pilot pattern for a third control information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
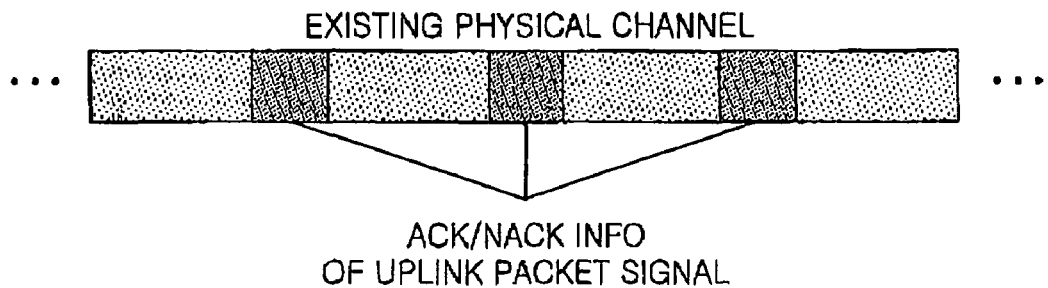
FIG. 1 is a diagram illustrating a conventional downlink physical channel for time-multiplexing control information with data before transmission.
Figure 2:
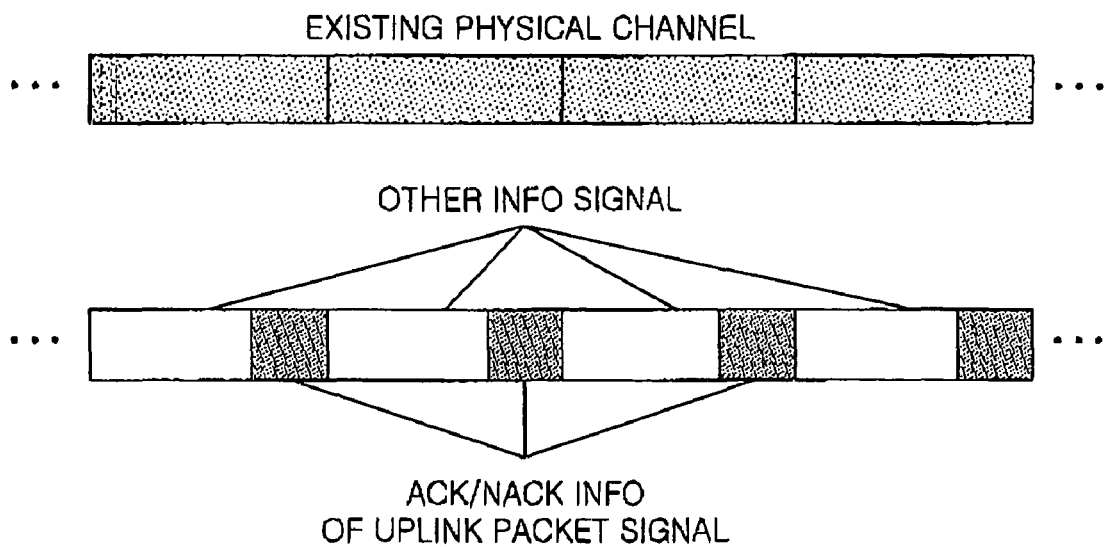
FIG. 2 is a diagram illustrating a conventional downlink physical channel for code-multiplexing control information with a physical channel before transmission.

Embodiments of the present invention will now be described in detail with reference to the annexed drawings. In the following description, a detailed description of known functions and configurations incorporated herein has been omitted for conciseness.

A. Outline of the Embodiments of the Invention

The embodiments of the present invention provide a scheme for transmitting/receiving control information using a symbol/bit phase and pattern of a common pilot channel, instead of transmitting control information using the conventional time multiplexing method in the separate code channel or the existing physical channel. For convenience, it will be assumed herein that three types of control information including first to third control information are transmitted. The first to third control information corresponds to the control information necessary for transmitting uplink packets in an asynchronous mobile communication system. MISS/ACK/NACK can be used as the three types of control information. Therefore, an embodiment of the present invention will be described with reference to the foregoing three types of control information. However, other types of control information can also be transmitted without departing from the scope of the present invention. Although an embodiment of the present invention will be described using a downlink channel, it should be obvious to those skilled in the art that the embodiment of the present invention can also be applied to an uplink channel. In the following description of embodiments of the present invention, a pilot pattern will be expressed using bits. However, the embodiments of the present invention can also be applied to a pilot pattern configured with symbols.

A method proposed by the present invention for generating a pilot pattern according to control information includes the following two steps:

Step 1

An embodiment of the present invention will be described with reference to an existing system in which a pilot pattern configured with N bits (or symbols) in an $i^{th}$ slot is transmitted. An $n^{th}$ pilot bit in an existing $i^{th}$ slot is denoted by $p_{i0(n)}$, and an $n^{th}$ pilot bit in a newly generated $i^{th}$ slot for newly transmitting $j^{th}$ control information is denoted by $p_{ij(n)}$. Here, the newly generated $p_{ij(n)}$ denotes a pattern which is orthogonal with the existing pilot pattern $p_{i0(n)}$.

If it is assumed that there are N orthogonal patterns which are orthogonal with the $p_{i0(n)}$, N patterns $p_{i,0}, p_{i,1}, \ldots, p_{i,N-1}$ are generated, and this indicates that N pieces of control information can be transmitted through a pilot field. Equation (1) shows the N patterns generated.

$$1/N \sum_{n}^{N} p_{i,j}(n) p_{i,q}(n) = 0, \ p = 0, 1, 2, \quad (1)$$

$$\ldots, N-1, q = 0, 1, 2 \ldots, N-1, p \neq q$$

Among the N patterns generated by Equation (1), patterns $p_{ia}$ (where a=1.3. . . . ,2N−3) excepting $p_{i0}$ are reordered in the order they were generated.

Step 2

A pattern whose sign is inverted is searched from the pilot patterns generated in Step 1. If a pattern obtained by inverting a sign of the pattern $p_{ia}$ is denoted by $p_{ia+1}$, the number of newly generated pilot patterns including the existing pilot pattern amounts to a minimum of 3 and a maximum of 2N−1. This number depends on whether the existing pilot pattern is configured with an appropriate number of bits for generating an orthogonal pattern.

In this embodiment of the present invention, if the foregoing method is used for generating a pattern by which control information will be carried, and there are N orthogonal patterns, then (2N−1) pieces of information can be transmitted. Therefore, a transmitter separately transmits control information pieces with the following patterns according to features thereof.

Figure 3:
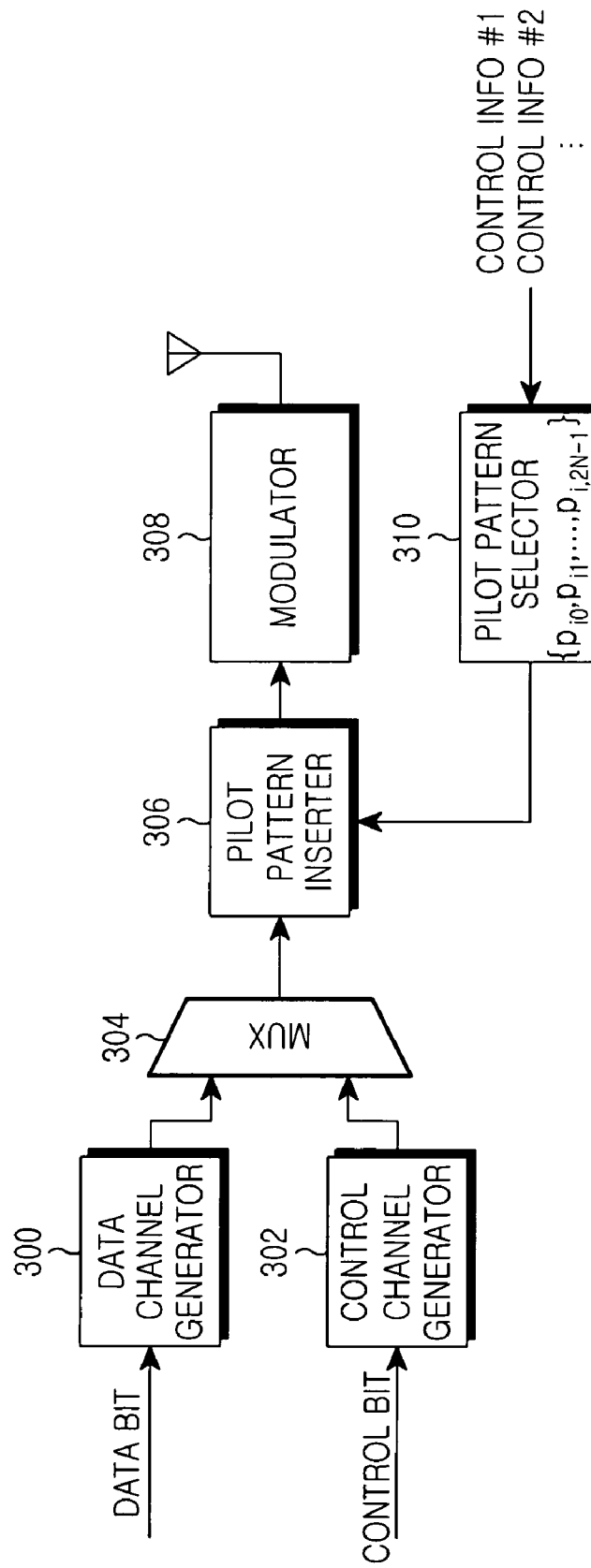
FIG. 3 is a block diagram illustrating a structure of a transmitter for transmitting control information according to an embodiment of the present invention.

Control information 0: $p_{i0}$ (exiting pattern)
Control information 1: $p_{i1}$
Control information 2: $p_{i2}$ (sign-inverted pattern of $p_{i1}$)
Control information 3: $p_{i3}$
Control information 4: $p_{i4}$ (sign-inverted pattern of $p_{i3}$)
. . .
Control information 2(N−1): $p_{i2(N-1)}$ FIG. 3 illustrates a structure of a transmitter for transmitting control information according to an embodiment of the present invention. Referring to FIG. 3, a Node B, receiving information on an uplink packet (e.g., data rate information) from a UE, receives uplink packet data based on the received information and demodulates the received uplink packet data. The Node B determines whether the received packet data is defective according to a result of the demodulation, and generates control information according to the analysis result. The generated control information is delivered to a pilot pattern selector 310. It is shown in FIG. 3 that only one control information piece selected from a plurality of control information pieces is input to the pilot pattern selector 310.

The pilot pattern selector 310 generates a particular signal $p_{i0(n)}, p_{i1(n)}$ or $p_{i2(n)}$ according to the input control information. The particular signal, i.e., pilot pattern, can be generated in the manner described above. An output signal of the pilot pattern generator 310 is delivered to a pilot pattern inserter 306.

A data channel generator 300 generates a data channel signal using received data bits, and delivers the generated data channel signal to a multiplexer (MUX) 304. A control channel generator 302 generates a control channel signal using received control information such as Transmit Power Control (TPC) bits and Transport Format Combination Indicator (TFCI) bits. The generated control channel signal is delivered to the multiplexer 304. The multiplexer 304 generates a channel signal by multiplexing the data channel signal and the control channel signal, and delivers the generated channel signal to the pilot pattern inserter 306.

The pilot pattern inserter 306 time-multiplexes the pilot pattern provided from the pilot pattern selector 310 with the channel signal. The time-multiplexed channel signal is modulated by a modulator 308, and then transmitted via a transmission antenna.

B. First Embodiment of the Invention

A first embodiment of the present invention proposes an apparatus and method for transmitting control information using one slot comprising a pilot field of a dedicated physical channel. To this end, this embodiment of the present invention defines pilot patterns which are uniquely allocated to control information pieces. Among the pilot patterns, a first pilot pattern is equal to a pilot pattern for an existing $i^{th}$ slot, a second pilot pattern is one of a plurality of pilot patterns which are orthogonal with the first pilot pattern, and a third pilot pattern is a pilot pattern obtained by inverting a sign of the second pilot pattern.

B-1. Structure and Operation of Transmitter

With reference to the accompanying drawing, a detailed description will now be made of the structure and operation of a transmitter according to an embodiment of the present invention.

Figure 4:
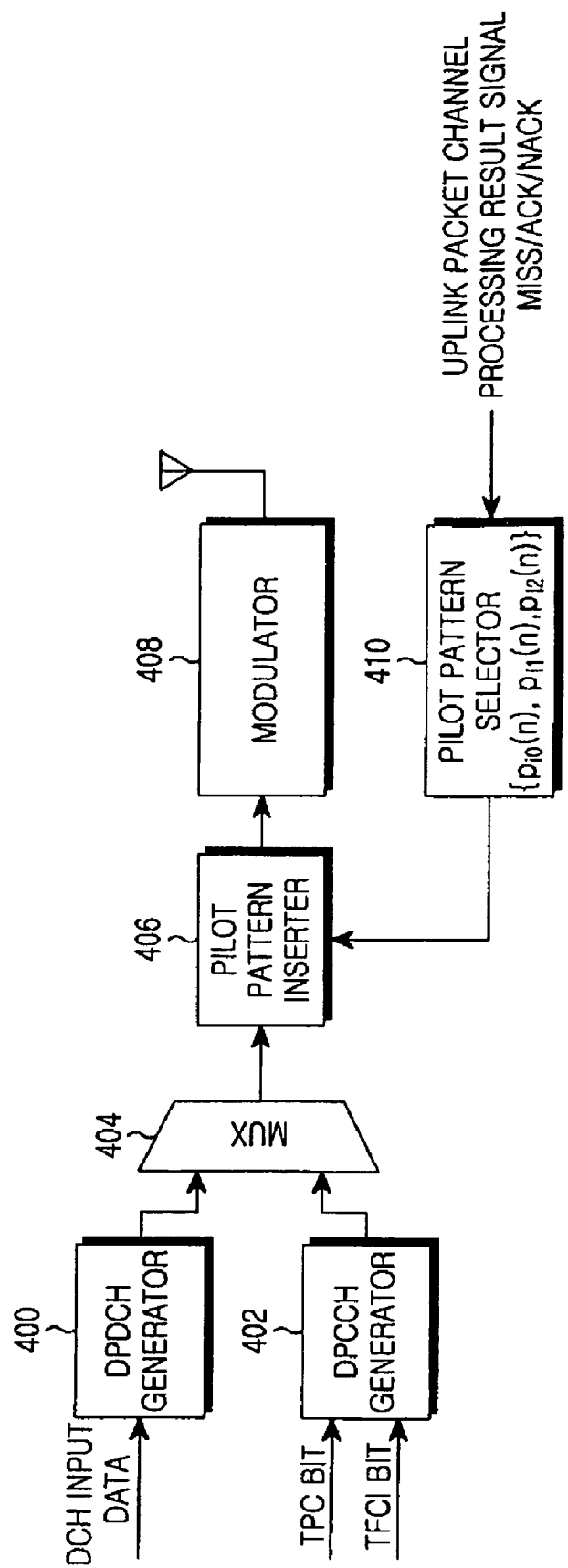
FIG. 4 is a block diagram illustrating a structure of a transmitter for transmitting MISS/ACK/NACK information signals as control information according to an embodiment of the present invention.

FIG. 4 illustrates the structure of a transmitter for transmitting MISS/ACK/NACK information according to an embodiment of the present invention. An embodiment of the present invention provides a scheme for transmitting MISS/ACK/NACK information using a pilot field of an existing downlink dedicated physical channel (DPCH). The transmitter comprises a dedicated physical data channel (DPDCH) generator 400, a dedicated physical control channel (DPCCH) generator 402, a multiplexer 404, a pilot pattern inserter 406, a modulator 408, and a pilot pattern selector 410.

Referring to FIG. 4, a Node B, receiving information on an uplink packet (e.g., data rate information) from a UE, receives uplink packet data based on the received information and demodulates the received uplink packet data. The Node B determines whether the received packet data is defective according to a result of the demodulation, and generates control information according to the determination. Specifically, if the received data is defective, the Node B generates NACK information for requesting retransmission of the data, and if the received data is error-free, the Node B generates ACK information indicating normal receipt of the corresponding data. However, if it is determined that no data is received, the Node B generates MISS information indicating a failure to receive corresponding data. The generated control information is delivered to the pilot pattern selector 410. The pilot pattern selector 410 generates a particular signal according to the provided control information. For example, the pilot pattern selector 410 generates $p_{i0(n)}$ if the control information is MISS information, generates $p_{i1(n)}$ if the control information is ACK information, and generates $p_{i2(n)}$ if the control information is NACK information. The $p_{i0(n)}$ is equal to a pilot pattern for an existing $i^{th}$ slot, the $p_{i1(n)}$ denotes a new pilot pattern newly defined such that it should be orthogonal with the $p_{i0(n)}$, and the $p_{i2(n)}$ denotes a sign-inverted pilot pattern of the $p_{i1(n)}$. It is possible to define $p_{i1(n)}$ which is orthogonal with all of ($N_{pilot} \geq 2$) $p_{i0(n)}$. An output signal of the pilot pattern selector 410 is delivered to the pilot pattern inserter 406.

The DPDCH generator 400 generates a DPDCH signal using received DCH data, and delivers the generated DPDCH signal to the multiplexer 404. The DPCCH generator 402 generates a DPCCH signal using received TPC bits and TFCI bits, and delivers the generated DPCCH signal to the multiplexer 404. The multiplexer 404 multiplexes the provided DPDCH signal and DPCCH signal into a DPCH signal, and delivers the DPCH signal to the pilot pattern inserter 406.

The pilot pattern inserter 406 time-multiplexes the DPCH signal with the pilot pattern provided from the pilot pattern selector 410. The time-multiplexed DPCH signal is modulated by the modulator 408, and then transmitted via a transmission antenna.

B-2. Structure and Operation of Receiver

With reference to the accompanying drawing, a detailed description will now be made of the structure and operation of a receiver according to an embodiment of the present invention.

Figure 5:
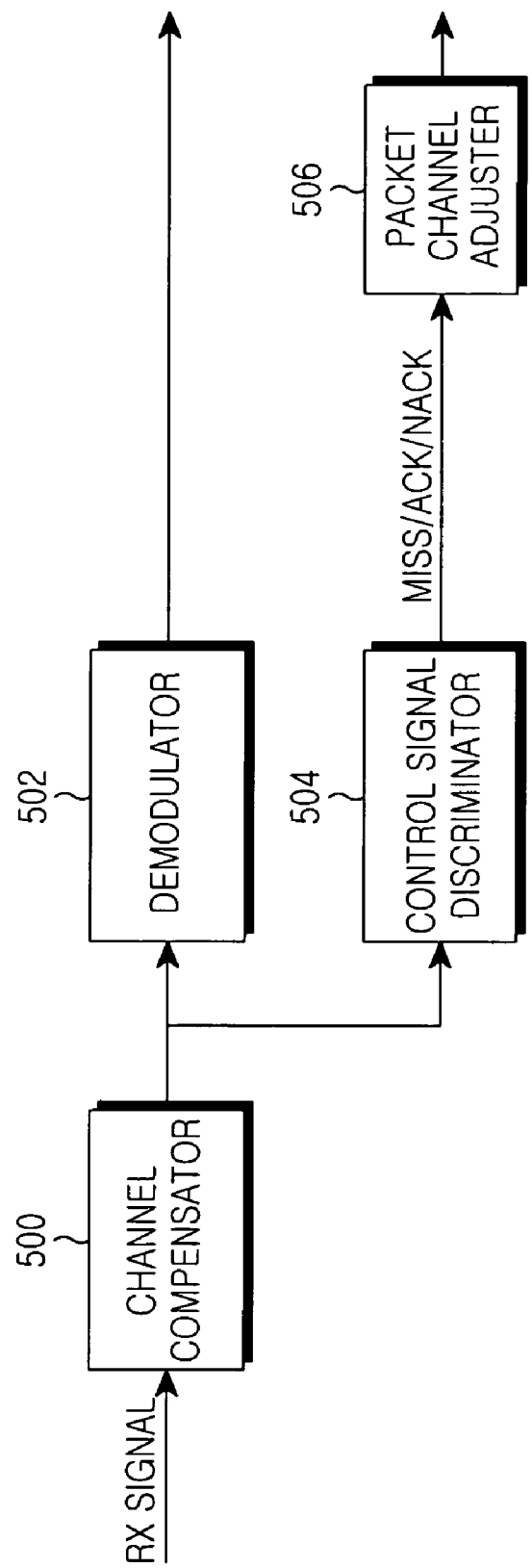
FIG. 5 is a block diagram illustrating a structure of a receiver according to an embodiment of the present invention.

FIG. 5 illustrates the structure of a receiver according to an embodiment of the present invention. An embodiment of the present invention provides a scheme for receiving MISS/ACK/NACK information using a pilot field of an existing downlink DPCH. The receiver comprises a channel compensator 500, a demodulator 502, a control signal discriminator 504, and a packet channel adjuster 506.

Referring to FIG. 5, a reception signal from a transmission side is input to the channel compensator 500. A DPCH signal in which a particular pilot pattern is inserted can be used as the reception signal. The channel compensator 500 performs channel compensation process based on a predetermined channel estimation value. The reception signal channel-compensated by the channel compensator 500 is provided to the demodulator 502 and the control signal discriminator 504. The demodulator 502 modulates the channel-compensated reception signal, and the control signal discriminator 504 checks a pilot pattern inserted in the channel-compensated reception signal, and determines control information to be transmitted through the pilot field based on the check result. A detailed structure and operation of the control signal discriminator 504 will be described in detail later with reference to FIGS. 6 and 7. The control information from the control signal discriminator 504 is provided to the packet channel adjuster 506. Any one of MISS/ACK/NACK information can be determined as the control information. The packet channel adjuster 506 determines whether to retransmit packet data based on the provided MISS/ACK/NACK information.

Embodiments of Control Signal Discriminator

Figure 6:
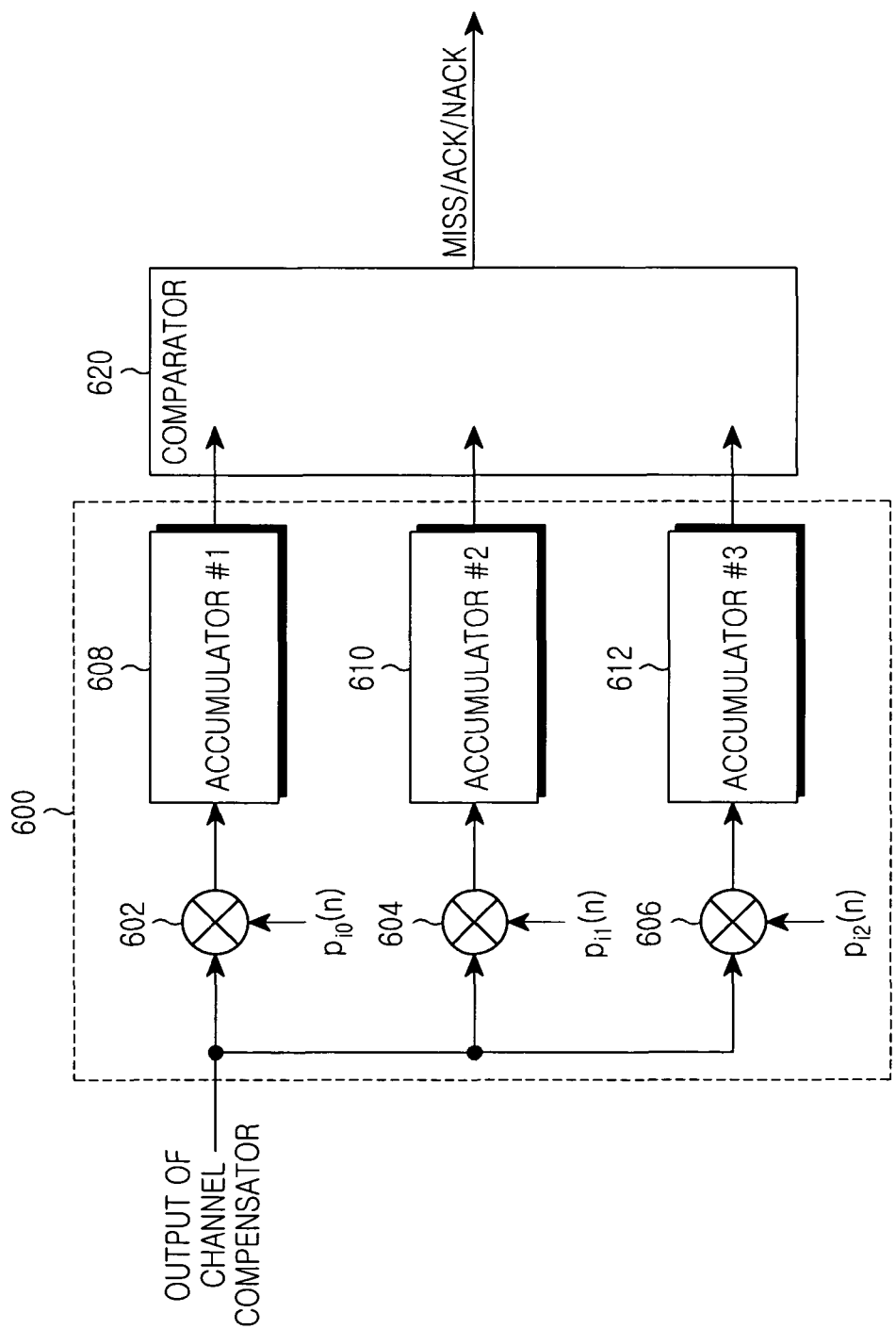
FIG. 6 is a detailed block diagram illustrating an example of a structure of the control signal discriminator illustrated in FIG. 5.
Figure 7:
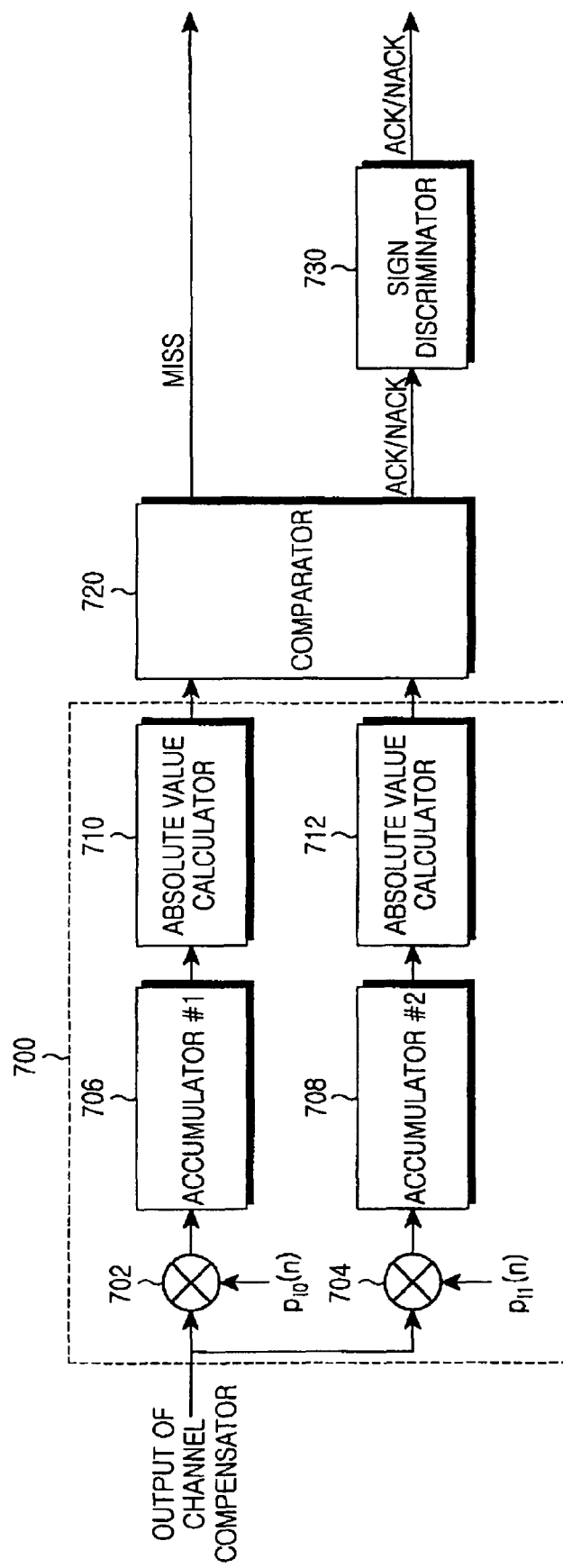
FIG. 7 is a detailed block diagram illustrating another example of a structure of the control signal discriminator illustrated in FIG. 5.

FIGS. 6 and 7 illustrate different embodiments of the control signal discriminator 504 illustrated in FIG. 5. The control signal discriminator 504 illustrated in FIG. 6 includes a correlation part 600 comprising a plurality of correlators and a comparator 620. Each of the correlators comprise one multiplier and one accumulator. The correlation part 600 comprises a maximum of (2N−1) correlators, and in FIG. 6, the correlation part 600 comprises three correlators, by way of example. The control signal discriminator 504 illustrated in FIG. 7 includes a correlation part 700 comprising a plurality of correlators, a comparator 720, and a sign discriminator 730. The correlation part 700 comprises a maximum of N correlators, and in FIG. 7, the correlation part 700 comprises two correlators, by way of example.

Referring to FIG. 6, an output of the channel compensator 500 is delivered to multipliers 602, 604 and 606 of respective correlators comprising the correlation part 600. The output signal of the channel compensator 500 delivered to the multipliers 602, 604 and 606 can be expressed as $$\hat{r}_i(n) = |h(i,n)|^2 \cdot p_{ij}(n) \quad n \in \{\text{pilot field}\} \quad (2)$$

In Equation (2), $p_{ij(n)}$ (j=0, 1 or 2) is a pilot pattern used in a transmission side and denotes a pilot pattern of control information j corresponding to an $n^{th}$ pilot signal in an $i^{th}$ slot, and h(i,n) denotes a response signal of a fading channel that an $n^{th}$ pilot signal has experienced in an ith slot. In addition, $\bar{r}_i(n)$ denotes a channel-compensated reception signal that underwent despreading.

A first multiplier 602 comprising a first correlator multiplies an output signal of the channel compensator 500 by $p_{i0(n)}$, and delivers the multiplication result to a first accumulator 608. A second multiplier 604 comprising a second correlator multiplies the output signal of the channel compensator 500 by $p_{i1(n)}$, a pattern which is orthogonal with the $p_{i0(n)}$, and delivers the multiplication result to a second accumulator 610. A third multiplier 606 comprising a third correlator multiplies the output signal of the channel compensator 500 by $p_{i2(n)}$, a sign-inverted pattern of the $p_{i1(n)}$, and delivers the multiplication result to a third accumulator 612. The accumulators 608, 610 and 612 accumulate the signals provided from their associated multipliers 602, 604 and 606 for a predetermined time. For example, in order to transmit K pieces of control information, K correlators are needed. Equation (3) illustrates a signal output from a $k^{th}$ accumulator from among the accumulators 608, 610 and 612, i.e., a $k^{th}$ correlator among the correlators.

$$Y_i = \frac{1}{N} \sum_{n=N_{start}}^{N_{end}} \bar{r}_i(n) \cdot p_{i,k}(n) = \begin{cases} |\bar{h}(i)|^2 \cdot |P|^2, & j = k \\ 0 \text{ or } -|\bar{h}(i)|^2 \cdot |P|^2, & j \neq k \end{cases} \quad (3)$$

In Equation (3), N denotes the number of pilot bits, $N_{start}$ and $N_{end}$ denote indexes of a start bit and an end bit of a pilot field, respectively, and $\bar{r}_i(n)$ denotes a power level of a pilot bit. In addition, k denotes an index designating a particular accumulator. For example, an index indicating the first accumulator 608 is k=0, an index indicating the second accumulator 610 is k=1, and an index indicating the third accumulator 612 is k=2.

As can be understood from Equation (3), a signal output from a correlator where the same pilot pattern as the pilot pattern used in the transmission side has a value of $|\bar{h}(i)|^2 \cdot |p|^2$. However, when the pilot pattern used in the transmission side is not identical to the pilot pattern used in a multiplier of a reception side, the following two cases can be taken into consideration. In a first case where a pilot pattern $p_{i,k}$ used in a $k^{th}$ correlator is orthogonal with a pilot pattern $p_{i,j}$ used in the transmission side, a value of 0 is ideally output from the $k^{th}$ correlator. In a second case where a pilot pattern $p_{i,k}$ used in a $k^{th}$ correlator is a pilot pattern generated by inverting a sign of a pilot pattern $p_{i,j}$ used in the transmission side, a value of the $p_{i,k}$ is output from the kth correlator.

The output values of the correlators are provided to the comparator 620. Three types of values, described above, are output from the correlators. The comparator 620 compares signal values provided from the first accumulator 608, the second accumulator 610, and the third accumulator 612 with one another. That is, the comparator 620 selects a correlator that ideally outputs $|\bar{h}(i)|^2 \cdot |p|^2$ among the values output from the correlators. This is because outputting $|\bar{h}(i)|^2 \cdot |p|^2$ indicates that a pilot pattern used in the corresponding correlator is identical to the pilot pattern used in the transmission side. Therefore, as the reception side can determine which pilot pattern was used in the transmission side, it can acquire control information to be transmitted. In this case, the transmitted control information is discriminated as control information j(≠k). That is, an index k of a correlator (or an accumulator) outputting the $|\bar{h}(i)|^2 \cdot |p|^2$ is regarded as transmitted control information j. For example, if a signal from the first accumulator 608 has a maximum value of $|\bar{h}(i)|^2 \cdot |p|^2$, the comparator 620 outputs MISS which is control information corresponding to an index of the first accumulator 608. If a signal from the second accumulator 610 has a maximum value of $|\bar{h}(i)|^2 \cdot |p|^2$, the comparator 620 outputs ACK which is control information corresponding to an index of the second accumulator 610. That is, 1 is output as a k value designating the second accumulator 610. Otherwise, if a signal from the third accumulator 612 has a maximum value of $|\bar{h}(i)|^2 \cdot |p|^2$, the comparator 620 outputs NACK which is control information corresponding to an index of the third accumulator 612. However, when a k value rather than control information is output from the comparator 620, a separate structure for determining control information is additionally required.

As described above, in a first embodiment of the control signal discriminator 504, if MISS/ACK/NACK control information (j=0, 1, 2) is transmitted from the transmission side, correlation values for respective pilot patterns are calculated through 3 correlators in the control signal discriminator 504. Thereafter, by determining a pilot pattern used in the transmission side based on the correlation values, the reception side can acquire control information corresponding to the pilot pattern.

Next, referring to FIG. 7, an output signal of the channel compensator 500 is delivered to multipliers 702 and 704 of respective correlators comprising the correlation part 700. The output signal of the channel compensator 500 delivered to the multipliers 702 and 704 can be expressed as Equation (2).

A first multiplier 702 comprising a first correlator multiplies the output signal of the channel compensator 500 by $p_{i0}^*(n)$, and delivers the multiplication result to a first accumulator 706. A second multiplier 704 comprising a second correlator multiplies the output signal of the channel compensator 500 by $p_{i1}^*(n)$, a pattern which is orthogonal with the $p_{i0}^*(n)$, and delivers the multiplication result to a second accumulator 708. The accumulators 706 and 708 accumulate the signals provided from their associated multipliers 702 and 704 for a predetermined time. For example, in order to transmit (2K−1) pieces of control information, K correlators are needed. Equation (4) illustrates a signal output from a $k^{th}$ accumulator (where k=0, ..., K−1) among the accumulators 706 and 708, i.e., a $k^{th}$ correlator among the correlators.

$$Y_i = \frac{1}{N} \sum_{n=N_{start}}^{N_{end}} \bar{r}_i(n) \cdot p_{i,k}(n) = \begin{cases} |\bar{h}(i)|^2 \cdot |P|^2, & j = k \\ 0 \text{ or } -|\bar{h}(i)|^2 \cdot |P|^2, & j \neq k \end{cases} \quad (4)$$

In Equation (4), N denotes the number of pilot bits, $N_{start}$ and $N_{end}$ denote indexes of a start bit and an end bit of a pilot field, respectively, and $|P|^2$ denotes a power level of a pilot bit. In addition, k denotes an index designating a particular accumulator.

An output value the first correlator 706 is provided to an absolute value calculator 710, and an output value of the second correlator 708 is provided to an absolute value calculator 712. The absolute value calculators 710 and 712 calculate absolute values for the values provided from their associated accumulators 706 and 708. In order to acquire control information using the absolute values, it is necessary to perform a first operation of distinguishing between ACK/NACK and MISS, and a second operation of distinguishing between ACK and NACK. The operation of distinguishing between MISS and ACK/NACK is performed by the comparator 720, and the operation of distinguishing between ACK and NACK is performed by the sign discriminator 730. The operation of acquiring control information is divided into two sub operations in this manner is due to characteristics of pilot patterns used to transmit control information in the transmission side. That is, the transmission side uses two pilot patterns which are orthogonal with each other, and a sign-inverted pilot pattern of any one of the two pilot patterns. The orthogonal pilot patterns are distinguished using the comparator 720, and the sign-inverted pilot pattern is distinguished by the sign discriminator 730.

The absolute values output from the absolute value calculators 710 and 712 are provided to the comparator 720. The comparator 720 compares the absolute values provided from the absolute value calculators 710 and 712, performing the first operation of distinguishing between MISS and ACK/NACK. In order to distinguish between MISS and ACK/NACK, the comparator 720 compares the two absolute values and selects a larger absolute value. Based on the selected absolute value, the comparator 720 determines whether the control information is MISS or ACK/NACK. If the absolute value from the absolute value calculator 710 is selected, the comparator 720 determines that the control information is MISS. Otherwise, if the absolute value from the absolute value calculator 712 is selected, the comparator 720 determines that the control information is ACK/NACK. If MISS is acquired as the control information, the comparator 720 outputs the MISS information to the packet channel adjuster 506. However, if ACK/NACK is acquired as the control information, the comparator 720 informs the sign discriminator 730 of the acquisition of the ACK/NACK. Being informed by the comparator 720 that the ACK/NACK was acquired, the sign discriminator 730 checks a sign of the value provided from the second accumulator 708. If a sign of the value provided from the second accumulator 708 is positive, the sign discriminator 730 outputs ACK to the packet channel adjuster 506 as control information. However, if a sign of the value provided from the second accumulator 708 is negative, the sign discriminator 730 outputs NACK to the packet channel adjuster 506 as control information.

B-3. Operation of Transmitter/Receiver

Figure 8:
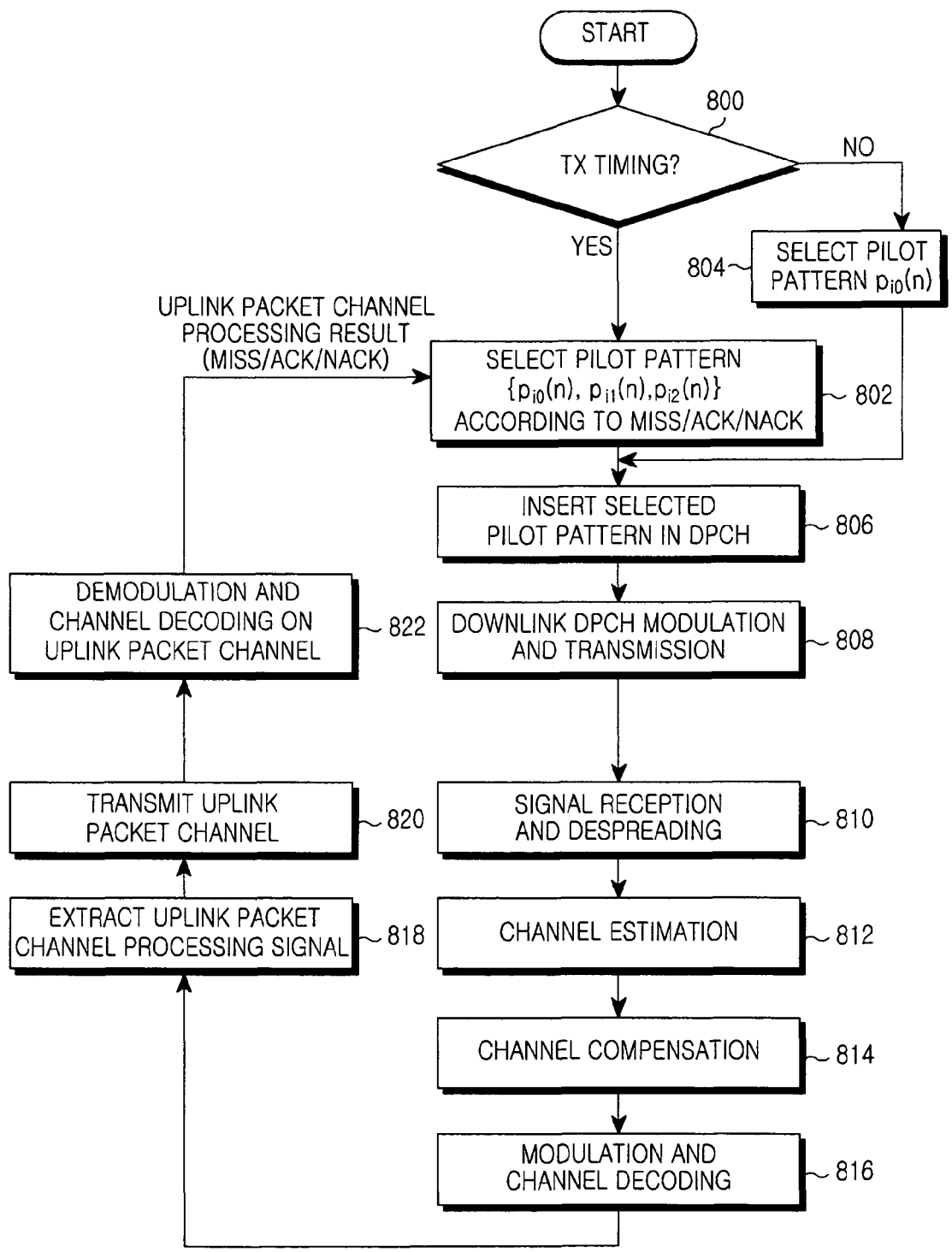
FIG. 8 is a flowchart illustrating an operation of a transmitter and a receiver according to an embodiment of the present invention

FIG. 8 illustrates an operation of a transmitter and a receiver according to an embodiment of the present invention. With reference to FIG. 8, a detailed description will now be made of an operation of a transmitter and a receiver according to an embodiment of the present invention.

In step 800, the transmitter determines whether a packet channel processing result indicates transmission timing. The packet channel processing result refers to a determination result on whether packet data is received and, if so, whether the received packet data is defective. If it is determined that the packet channel processing result indicates transmission timing, the transmitter proceeds to step 802. Otherwise, if it is determined that the packet channel processing result does not indicate transmission timing, the transmitter proceeds to step 804. In step 802, the transmitter selects a pilot pattern corresponding to the uplink packet channel processing result. Pilot patterns corresponding to the uplink packet channel processing result include $p_{i0(n)}$, $p_{i1(n)}$ and $p_{i2(n)}$. The $p_{i0(n)}$ is a predetermined pilot pattern and indicates that corresponding packet data is not received. The $p_{i1(n)}$ is a pilot pattern being orthogonal with the $p_{i0(n)}$ and indicates that received packet data is error-free. The $p_{i2(n)}$ is a sign-inverted pilot pattern of the $p_{i1(n)}$ and indicates that received packet data is defective. In step 804, the transmitter generates $p_{i0(n)}$ which is a common pilot pattern as an uplink packet channel processing signal. After selecting a pilot pattern in step 802 or 804, the transmitter proceeds to step 806. In step 806, the transmitter inserts the selected pilot pattern in a DPCH through time multiplexing, and then proceeds to step 808 where it transmits the time-multiplexed DPCH to the receiver after modulation. For reference, a procedure between step 808 and step 810 is developed on a radio channel.

In step 810, the receiver receives the DPCH and despreads the received DPCH, and proceeds to step 812 where it performs channel estimation. In steps 814 and 816, the receiver performs channel compensation, demodulation and channel decoding on the received signal. In step 818, the receiver acquires control information transmitted from the transmitter through a pilot field in the method described with reference to FIGS. 6 and 7. If MISS information is acquired as control information, the receiver determines that the transmitter has failed to receive its desired packet data. If ACK information is received as control information, the receiver determines that the transmitter has successfully received its desired packet data. If NACK information is received as control information, the receiver determines that packet data desired by the transmitter is defective. Thereafter, in step 820, the receiver retransmits the corresponding packet data or transmits the next packet data according to the acquired control information. For reference, a procedure between step 820 and step 822 is developed on a radio channel.

In step 822, the transmitter performs demodulation and decoding on the received packet data, and outputs control information corresponding to an uplink packet channel processing result through the demodulation and decoding process. Here, the control information will be any one of MISS/ACK/NACK. Thereafter, the transmitter performs steps 802 through 808 based on the control information.

C. Second Embodiment of the Invention

The foregoing embodiment of the present invention has been described with reference to a scheme for transmitting control information (ACK/NACK or MISS/ACK/NACK) using one slot. However, when greater reliability is required, a pilot pattern can be repeatedly transmitted/received over a plurality of slots. Specifically, a transmission side performs demodulation and decoding on received packet data, and outputs control information corresponding to an uplink packet channel processing result through the demodulation and decoding process. The transmission side repeatedly transmits a pilot pattern corresponding to the control information over 3 slots. The next 3 slots are used for repeatedly transmitting a pilot pattern including control information for the next packet. Then a reception side receives control information over 3 slots and generates final control information by combining the received control information, thereby improving reliability of the control information. As an alternative method, the transmission side performs demodulation and decoding on received packet data, and outputs control information corresponding to an uplink packet channel processing result through the demodulation and decoding process. The transmission side generates a pilot pattern corresponding to the control information on a 3-slot pilot pattern basis. Then the reception side receives a pilot pattern over 3 slots, and extracts control information transmitted by the transmission side. Therefore, when the number of bits of a pilot pattern included in one slot is 4, a total of 12 bits constitute one piece of control information, improving reliability of the control information as compared with when one piece of control information comprises 4 bits.

As another alternative method, a field specified for another use in the existing pilot field is maintained, and only a part of the field can be used for transmission of control information. For example, the above-stated "another use" includes a frame sync word (FSW) used for matching frame synchronization in an asynchronous mobile communication system. Also, a part of the pilot pattern can be used for channel estimation.

In a second embodiment of the present invention, a pilot pattern (Normal) specified in TS25.211, a current standard for an asynchronous mobile communication system, is used. Table 3 illustrates a 2-symbol pilot pattern for N=4 (where N denotes the number of pilot bits) in TS25.211.

TABLE 3

|  | Normal (MSS) | | ACK | | NACK | |
|---|---|---|---|---|---|---|
| Est # | 01 | 23 | 01 | 23 | 01 | 23 |
| Slot #0 | 11 | 11 | 10 | 11 | 01 | 11 |
| 1 | 11 | 00 | 10 | 00 | 01 | 00 |
| 2 | 11 | 01 | 10 | 01 | 01 | 01 |
| 3 | 11 | 00 | 10 | 00 | 01 | 00 |
| 4 | 11 | 10 | 10 | 10 | 01 | 10 |
| 5 | 11 | 11 | 10 | 11 | 01 | 11 |
| 6 | 11 | 11 | 10 | 11 | 01 | 11 |
| 7 | 11 | 10 | 10 | 10 | 01 | 10 |
| 8 | 11 | 01 | 10 | 01 | 01 | 01 |
| 9 | 11 | 11 | 10 | 11 | 01 | 11 |
| 10 | 11 | 01 | 10 | 01 | 01 | 01 |
| 11 | 11 | 10 | 10 | 10 | 01 | 10 |
| 12 | 11 | 10 | 10 | 10 | 01 | 10 |
| 13 | 11 | 11 | 10 | 11 | 01 | 11 |
| 14 | 11 | 11 | 10 | 11 | 01 | 11 |

Because an operation of the present invention has been described on a per-bit basis, symbols in Table 3 are expressed in terms of bits. In the case of Normal, $0^{th}$ and $1^{st}$ bits are regularly configured with (1 1), but $2^{nd}$ and $3^{rd}$ bits are changed every slot. In Table 3, the bits which are changed every slot are shaded. The shaded part, serving as an FSW, is a predetermined pattern used for matching synchronization. It is also possible to search for an orthogonal pilot pattern for all of 4 bits, including the shaded part. However, in order to avoid modification of an existing pilot pattern designed for a special purpose, this embodiment of the present invention is applied only to a part of the $0^{th}$ and $1^{st}$ bits in transmitting MISS/ACK/NACK. For example, for MISS, the existing (1 1) is used. However, for ACK, (1 0) is defined as a pilot pattern, and for NACK, (0 1) is defined as a pilot pattern, in applying the present invention. In Table 3, expressions 0 and 1 of a binary signal correspond to +1 and −1, respectively. In this case, the channel compensator 500 of FIG. 5 should have an additional function of separately extracting bits defined for a predetermined purpose and pilot bits generated for transmission of control information in a pilot pattern transmitted through a pilot field of a DPCH. This function is equal in principle to an operation of extracting only a pilot pattern from a time-multiplexed DPCH signal, and can be realized by a person skilled in the art.

Although the embodiments of the present invention have been described with reference to the examples in which MISS/ACK/NACK are mapped to a particular pilot pattern, the mapping relation between MISS/ACK/NACK and a pilot pattern is variable according to operator's choice. In addition, although only MISS/ACK/NACK were used as control information in the embodiments of the present invention, as many pieces of control information as the number of pilot patterns generated according to the gist of the present invention can also be transmitted using a pilot field.

As described above, the embodiments of the present invention provide an apparatus and method for realizing transmission of control information using a new pattern generated from an existing pilot pattern. That is, a Node B transmits an uplink packet channel decoding result using a pilot field of a downlink DPCH, and a UE extracts the uplink packet channel decoding result by extracting a pilot field of a DPCH and performs an ARQ or HARQ operation on an uplink packet channel. Therefore, the embodiments of the present invention transmit an uplink packet channel decoding result without a separate physical channel or a data loss of the existing channel, preventing additional consumption of power and OVSF code resources. In addition, performance deterioration of the existing physical channel is prevented in accordance with embodiments of the present invention. Finally, because a part of the existing pilot pattern is designed for a special purpose, control information can be transmitted without affecting such the part.

While the invention has been shown and described with reference to certain preferred embodiments thereof, it should be understood by those skilled in the art that various changes in form and details may be made therein without departing from the spirit and scope of the invention as defined by the appended claims.

What is claimed is:

1. A method for transmitting control information for receipt of data in a receiver in a mobile communication system including a transmitter for transmitting the data and the receiver for receiving the data, the method comprising the steps of:

selecting the control information according to whether the data is received; and selecting a pilot pattern according to the control information, and inserting the selected pilot pattern in a pilot field of a physical channel as the control information, before transmission;

wherein the pilot pattern includes a first pilot pattern used when a first control information is transmitted, a second pilot pattern being orthogonal with the first pilot pattern for a second control information, and a third pilot pattern generated by inverting a sign of the second pilot pattern for a third control information.

2. The method of claim 1, wherein the first pilot pattern is selected when the data is not received.

3. A method for receiving control information for receipt of data transmitted by a receiver in a transmitter in a mobile communication system including the transmitter for transmitting the data and the receiver for receiving the data, the method comprising the steps of:

receiving a signal from the transmitter;

calculating correlation values between the received signal and pilot patterns used in the transmitter;

determining a pilot pattern inserted in the received signal based on the correlation values;

determining control information corresponding to the determined pilot pattern;

outputting the determined control information; and determining whether the data is received and, if received, whether the received data is defective, based on the determined control information, wherein the pilot pattern includes a first pilot pattern used when a first control information is not transmitted, a second pilot pattern being orthogonal with the first pilot pattern for a second control information, and a third pilot pattern generated by inverting a sign of the second pilot pattern for a third control information, and wherein the first control information is a MISS information indicating a failure to receive corresponding data, the second control information is ACK information indicating normal receipt of the corresponding data, and the third control information is NACK information indicating defective data has been received.

4. The method of claim 3, wherein the first pilot pattern is selected when the data is not received.

5. An apparatus for transmitting control information for receipt of data in a receiver in a mobile communication system including a transmitter for transmitting the data and the receiver for receiving the data, the apparatus comprising:
- a pilot pattern selector for selecting one pilot pattern from among a predetermined number of different pilot patterns according to whether the data is received and, if received, whether the received data is defective;
- a pilot pattern inserter for inserting the selected pilot pattern in a pilot field of a physical channel as the control information; and
- an antenna for transmitting the physical channel;
- wherein the predetermined number of different pilot patterns include a first pilot pattern used when a first control information is transmitted, a second pilot pattern being orthogonal with the first pilot pattern for a second control information, and a third pilot pattern generated by inverting a sign of the second pilot pattern.

6. The apparatus of claim 5, wherein the first pilot pattern is selected when the data is not received.

7. An apparatus for receiving control information for receipt of data transmitted by a receiver in a transmitter in a mobile communication system including the transmitter for transmitting the data including a selected pilot pattern among a plurality of pilot patterns and the receiver for receiving the data, the apparatus comprising:
- a channel compensator for performing channel compensation on a signal transmitted from the transmitter; and
- a control signal discriminator for calculating correlation values between the signal and pilot patterns used in the transmitter, determining a pilot pattern inserted in the signal based on the correlation values; determining control information corresponding to the determined pilot pattern and outputting the determined control information,
- wherein the pilot pattern includes a first pilot pattern used when a first control information is transmitted, a second pilot pattern being orthogonal with the first pilot pattern for a second control information, and a third pilot pattern generated by inverting a sign of the second pilot pattern for a third control information, and
- wherein the first control information is a MISS information indicating a failure to receive corresponding data, the second control information is ACK information indicating normal receipt of the corresponding data, and the third control information is NACK information indicating defective data has been received.

8. The apparatus of claim 7, wherein the first pilot pattern is selected when the data is not received.

9. A method for transmitting control information for receipt of data in a receiver in a mobile communication system including a transmitter for transmitting the data and the receiver for receiving the data, the method comprising the steps of:
- selecting the control information among at least three control states according to whether the data is received; and
- selecting a pilot pattern among at least three pilot patterns according to the selected control information, and inserting the selected pilot pattern in a pilot field of a physical channel as the control information, before transmission;
- wherein the pilot pattern selected according to the control information is an orthogonal pattern which is generated using remaining bits except pilot bits having a predetermined purpose among bits of a basic pilot pattern.

10. The method of claim 9, wherein the basic pilot pattern is a pattern selected when there is no received packet data.

11. The method of claim 9, wherein the basic pilot pattern transmitted through a one-slot pilot field includes frame sync word (FSW) bits for matching synchronization.

12. The method of claim 9, wherein the basic pilot pattern transmitted through a one-slot pilot field includes bits for channel estimation.

13. The method of claim 9, wherein the pilot pattern selected for transmission of the control information is the orthogonal pattern which is generated using the remaining bits except bits used for FSW or channel estimation among bits constituting the basic pilot pattern.

* * * * *